Patented Dec. 19, 1944

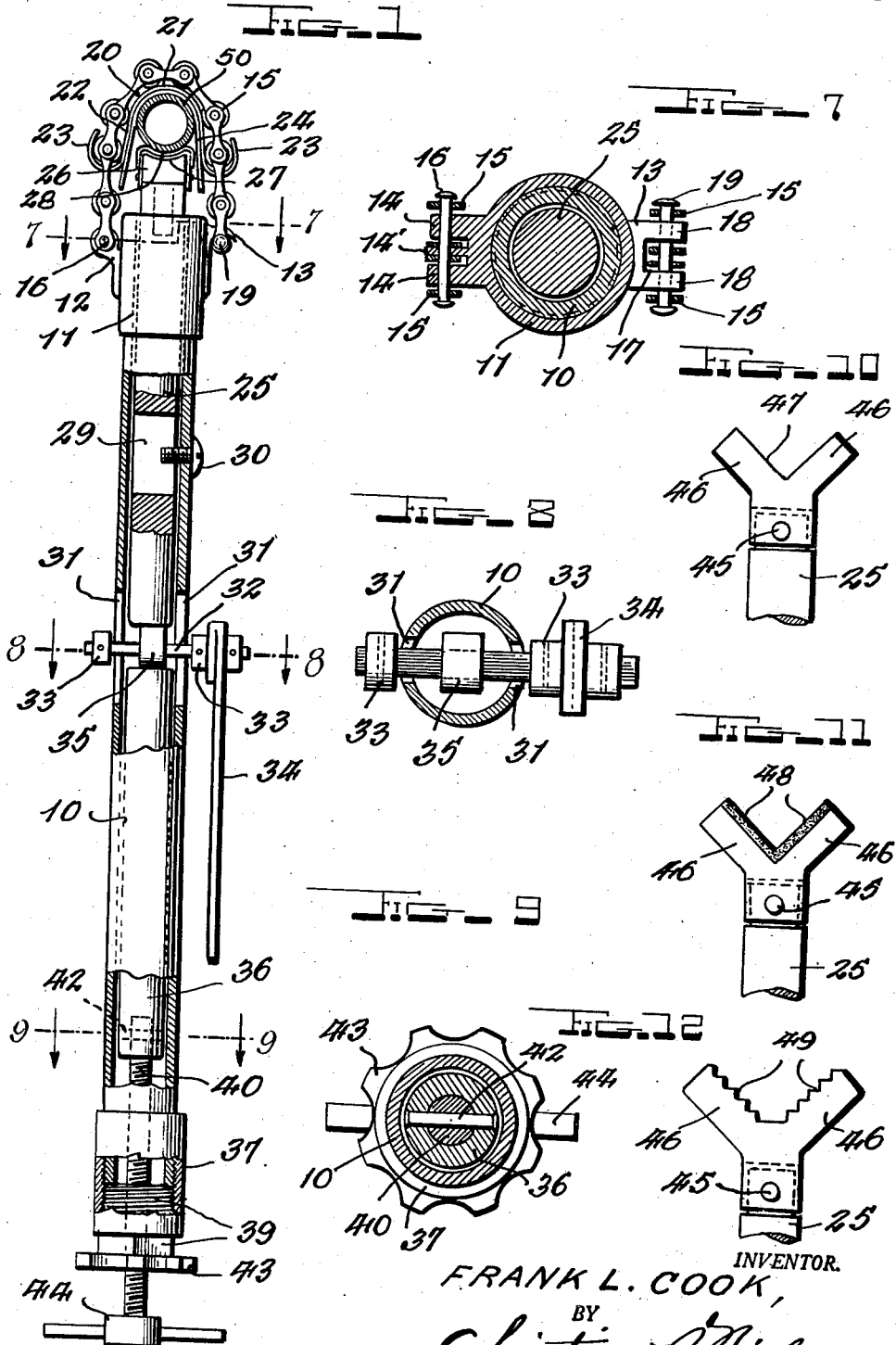

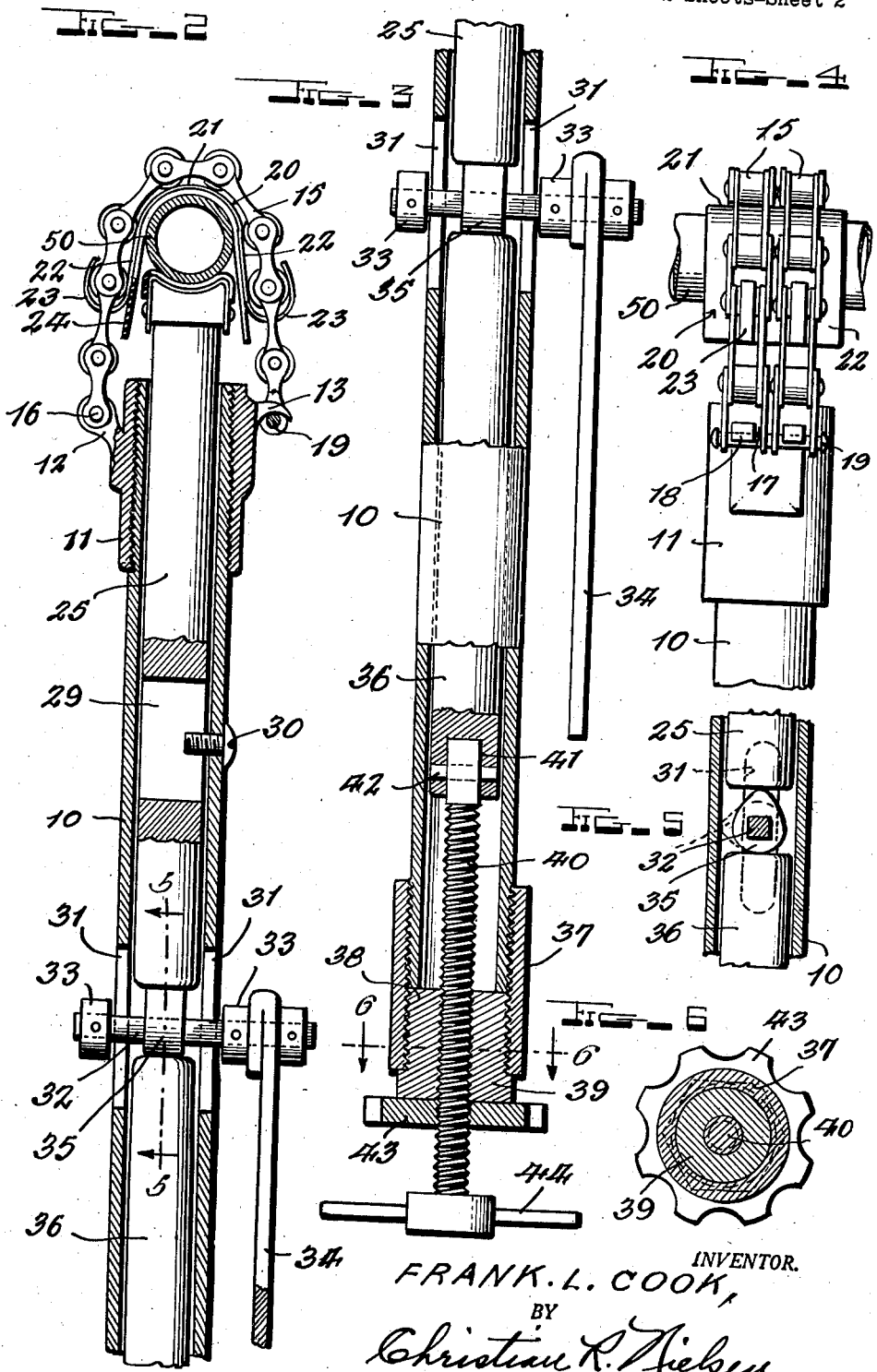

2,365,627

UNITED STATES PATENT OFFICE 2,365,627

PIPE WRENCH

Frank L. Cook, South Bend, Ind.

Application April 29, 1944, Serial No. 533,352

6 Claims. (Cl. 81—65)

The invention has for an object to present a novel construction in wrenches suitable for use upon pipe, and particularly upon fancy finished pipe, such as nickel-plated, chromium-plated, polished brass, and the like, so that such pipe may be very firmly gripped for positive holding while being threaded or while being screwed into place upon various installations, and while having fixtures attached thereto.

It is one of the most important aims of the invention to enable the very positive gripping of pipe such as brass pipe, with a minimum liability of distortion of the pipe, which is peculiarly liable, if the pipe is annealed for thin wall tubing.

Another important object of the invention is to provide a device which may be used as a wrench or as a vise, which is adapted to very rapid manipulation to grip or release an inserted pipe, and which is quickly adjustable to secure the most highly effective gripping action. A further important aim of the invention is to enable the use of a cam action device which may be nicely adjusted to assure the maximum gripping with the cam device on dead center, so that it will remain in gripping engagement with the pipe without requiring special manipulation to maintain the grip, and without requiring the operation of clamping screws for the engagement or release of the pipe, but enabling the very rapid gripping or release of the pipe by a simple movement of the gripping lever.

Another important aim of the invention is to enable the embodiment of such a wrench, at an extremely low cost and yet in a highly efficient form, which will be liable in a minimum degree to deterioration or impairment by wear, and the severe uses to which tools are apt to be subjected in the plumbing trade.

Additional advantages, objects, and features of invention reside in the construction, arrangement and combination of parts involved in the embodiment of the invention, as will be more readily understood from the following description and accompanying drawings, wherein Figure 1 is an elevational view of the wrench, partly in section, illustrating the device in use.

Figure 2 is an enlarged fragmentary longitudinal sectional view thereof.

Figure 3 is a similar view showing parts for obtaining adjustment of the wrench.

Figure 4 is a fragmentary elevation of the pipe gripping means, at right angles to Figure 2.

Figure 5 is a sectional view illustrating the cam device employed in the wrench.

Figure 6 is a cross section on the line 6—6 of Figure 3.

Figure 7 is a cross section on the line 7—7 of Figure 1.

Figure 8 is a similar view on the line 8—8 of Figure 1.

Figure 9 is a cross section on the line 9—9 of Figure 1.

Figures 10 to 12 illustrate modified forms of pipe engaging saddles.

Referring more particularly to the drawings, there is shown a body tube 10, which serves as the handle of the wrench, and is of a diameter preferably somewhat greater than that of a pipe to be engaged. One end of this tube, which may be termed the inner end, because it is nearest the work when used, is provided with a head 11 upon opposite sides of which there is formed an anchor loop 12 and a chain-receiving hook 13. As may be seen in Figure 7, the loop 12 consists of two spaced apertured ears 14 of substantial construction, between which there is formed an apertured ear 14' of lesser thickness. A pair of flexible roller link chains 15 are employed, arranged in side by side relation, as clearly shown in Figure 4, the links of the chains at one end being arranged to straddle respective lugs 14 and present apertures of the links in alignment with apertures of the ears 14 and 14' for reception of a pintle 16.

The chain-receiving hook 13 is medially bifurcated, as at 17, presenting spaced hook members 18 of a width to readily pass between respective links of the other ends of the chains for reception of a pin 19 which is extended through aligned apertures of the terminal links of the chains. Medially of the length of the chains a flexible metallic saddle 20 is connected, and as shown in Figures 1, 2 and 4, the saddle is formed with an arcuate bight portion 21 and diverging wing members 22, the lower edges of which are formed with strap members 23 of a width to pass between respective links of the chains, the straps being bent around respective rollers of the chains. As may be seen in Figure 4, the saddle is of a width so as to extend a substantial distance beyond the longitudinal edges of the chains, and by reason of the fact that the chains are securely fixed to the saddle, the chains are movable in unison and lateral slippage of the chains so as to engage any portion of a pipe is prevented. The underside of the saddle 20 is provided with a suitable flexible material 24, with a high coefficient of friction.

Within the body tube 10 there is a floating plunger 25, the outer end of which is formed with a head 26 having a segmental cylindrical face 27 arranged in opposed relation to the bight portion 21 of the saddle. The face 27 is also provided with a material 28 with a high coefficient of friction.

The plunger 25 is longitudinally slotted, as at 29, and the tube 10 is apertured and tapped for reception of a screw 30, the shank of which projects slightly within the slot 29. By this construction, the plunger 25 may partake of longitudinal sliding movements as will be required, the shank of the screw preventing rotation of the plunger and thus insuring proper alignment of the head 26 with respect to the saddle.

Approximately intermediate the length of the tube 10 diametrically opposed longitudinal slots 31 are formed through which a shaft 32 is extended, the ends of the shaft outwardly of the tube having fixed thereto a collar 33 for maintaining the shaft within the slots, yet freely movable throughout the length of the slots. The shaft projects a substantial distance at one side of the tube and has an operating lever 34 secured thereon. Fixed upon the shaft 31 and disposed within the tube 10 there is a cam or eccentric 35 adapted to contact the adjacent end of the plunger 25 and the free end of a compression plunger 36, rotatably and slidably mounted within the tube 10, as will be described.

As clearly shown in Figure 3, the lower end of the tube 10 is exteriorly threaded and receives thereon a nipple 37 of a length so as to extend a substantial distance beyond the tube so as to present an interiorly threaded portion 38 within which there is engaged a threaded plug 39. The plug 39 is of a size and length so as to contact and seat against the nipple 37 and the terminal end of the tube thus locking these elements in coupled engagement. The plug 39 is provided with an axial threaded opening for mounting of a threaded shaft 40, the inner end of which is of angular formation and complemental to an axial angular opening 41 formed in the lower end of the plunger 36. The shaft 40 and plunger 36 are pinned or otherwise secured together as indicated at 42.

Upon the threaded shaft 40 outwardly of the plug 39 there is a lock nut 43 suitably scalloped or otherwise formed so that the nut may be readily rotated to lock the shaft 40 and plunger 36 against longitudinal or rotative movements. The extreme end of the shaft 40 is provided with an operating head 44 permitting ready rotation of the shaft and plunger, at times.

In Figures 10, 11 and 12, modifications of the head 26 are shown, in which the latter is pivotally connected with the plunger 25, as indicated at 45. Also, the pipe engaging face of the head is shown as consisting of oppositely diverging arms 46, thus providing an angular seat 47 within which a pipe may be engaged. The inner faces of the arms 46 may be smooth as in Figure 10; faced with a suitable material 48 as in Figure 11, and for rough work where it is immaterial whether the pipe becomes marred due to gripping action, the faces may be formed with serrations 49 as shown in Figure 12.

In use of the wrench, a pipe 50 being engaged between the seat 27 and the bight portion of the saddle 20, the free ends of the chains 15 are secured within the hook member 13. The operating lever 34 will be in a position crosswise of the tube 10 and the cam 35 will be in a corresponding position, as indicated in dotted lines in Figure 5. The lock nut 43 will be in released position so that the shaft 40 may be rotated by means of the operating head 44. Rotation of the shaft 40 will cause longitudinal sliding movement of the compression plunger 36 so as to lightly engage the cam 35, or very slightly spaced therefrom. The lock nut 43 is now screwed inwardly upon the shaft 40 so as to snugly abut the plug 39. In order to firmly grip the pipe, the lever 34 is rotated so as to lie parallel with the tube body 10, which movement of the lever will impart movement to the cam, which in turn will effect outward sliding movement of the floating plunger 25, thus forcing the head 26 against the pipe 50 which in turn will be forced against the saddle 20. With the high lobe of the cam in a dead center position, as shown in Figure 5, the adjusted position will be maintained. Where the same diameter of pipes are being worked upon readjustment of the wrench is not required, and the only operation required will be to actuate the handle to its initial position, whereupon sufficient slack will be obtained to release the pipe for endwise sliding movement from the chains or for release of the chains from the hooks 13, as desired. For adjusting the wrench to use upon larger or smaller pipes, it is only necessary to loosen the lock nut 43 so that the compression plunger 36 may be adjusted to a desired position.

While I have shown and described a preferred form of the wrench, this is by way of illustration only, and I consider as my own all such modifications as fairly fall within the scope of the appended claims.

I claim:

1. A pipe wrench or the like comprising a tubular body member having a transversely extending member at one end adapted to form a loop, a floating plunger within the body member and having a head movable within the bight of the loop for engagement of an interposed pipe, a compression plunger within the body member rearwardly of the floating plunger, means for adjusting the longitudinal position of the compression plunger, a cam member interposed between adjacent ends of the floating and compression plungers, and lever means associated with the cam for effecting sliding movement of the floating plunger in the direction of the loop.

2. The structure of claim 1 in which said tube is longitudinally slotted on opposed sides, said cam having trunnions extended revolubly through the slot and having said lever means fixed on the extremity of one of the trunnions.

3. The structure of claim 1, in which said transversely extending member is a pair of interconnected parallel roller chains, releasably connected at one end to said tubular member, said chains forming a loop across the end of the tubular member, a friction facing material on the inner side of the loop and a corresponding facing on the head of the plunger opposed thereto.

4. A pipe wrench or the like comprising a tubular body member, a floating plunger within the body member and having a pipe-engaging head exteriorly of the body member at one end, said plunger having a longitudinally extending slot, a member on the tubular body member projected into said slot to prevent rotation of said floating plunger, said tubular body member having spaced longitudinally extending slots intermediate its length, a shaft extended through said slots and secured against displacement, a cam fixed medially of the shaft adapted to contact the rear end of said plunger, a compression plunger within the tubular body member rearwardly of the cam, a threaded shaft connected to the rear end of said compression plunger, an interiorly threaded plug within the tubular member adapted to threadedly engage the threaded shaft, means exterior of the plug for rotating the shaft, means for locking said shaft in an adjusted position, a lever fixed to the shaft associated with said cam to provide rotation of the latter to effect outward longitudinal movement of the floating plunger, and a flexible member connected with the tubular body member extended transversely across the head of the floating plunger to form a loop.

5. The structure of claim 4 in which the flexible member consists of a pair of roller chains, a U-shaped saddle member disposed across and extended beyond the longitudinal edges of said chains, said saddle being fixed to respective chains, one end of said chains being detachably connected to said tubular body member, and friction facings on said head member and the bight of said saddle member.

6. The structure of claim 4 in which the pipe-engaging head is pivotally connected to said floating plunger.

FRANK L. COOK.